United States Patent [19]

Braun

[11] Patent Number: 4,541,647
[45] Date of Patent: Sep. 17, 1985

[54] RECUMBENT BICYCLE

[76] Inventor: Norman L. Braun, Box 718, Winkler, Manitoba, Canada, R0G 2X0

[21] Appl. No.: 529,332

[22] Filed: Sep. 6, 1983

[51] Int. Cl.⁴ .............................................. B62M 1/12
[52] U.S. Cl. .................................... 280/234; 280/270
[58] Field of Search ............... 280/234, 244, 240, 247, 280/270

[56] References Cited

U.S. PATENT DOCUMENTS 2,884,259  4/1959  Snodgrass ........................ 280/234
3,895,825  7/1975  Sink .................................. 280/234
3,910,599  10/1975  Thomas ............................ 280/234

FOREIGN PATENT DOCUMENTS 833700  10/1938  France ............................... 280/240

Primary Examiner—John A. Pekar
Attorney, Agent, or Firm—Stanley G. Ade

[57] ABSTRACT

A recumbent bicycle includes a seat with a back rest and pedals forwardly of the seat so that reaction from the pedals can be communicated by the rider into the back rest of the seat. A pair of levers immediately in front of the seat can be operated in reciprocal movement to add to the propulsion effort of the pedals with the levers communicating to the chain wheel of the pedals through connecting levers and a further chain wheel. Steering movement is obtained by a common pivotal movement of the levers to the left or to the right about a longitudinal horizontal axis with the common movement of the levers being communicated to the front wheel by a system of levers.

8 Claims, 2 Drawing Figures

RECUMBENT BICYCLE

BACKGROUND OF THE INVENTION

This invention relates to a recumbent bicycle particularly to an improvement therein whereby the hands of the rider can be used in an effective manner for both propulsion and for steering of the bicycle.

In the early years of bicycle development very many proposals were made for arrangement of bicycle which used pedal propulsion or hand operated propulsion and in some cases propulsion by both techniques. However, over the years most of these peculiar designs fell by the wayside leaving bicycle design basically in a single pattern with the rider sitting well above the wheels having simple handle bars in front of the saddle and generally at the same height as the saddle and with the propulsion being provided by pedals positoned well below both the handle bars and the saddle and approximately midway between. This design has almost completely superseded any other type of design and differences between various models are generally so small as to be hardly discernible.

However in recent years some attention has been given to an alternative design generally known as a recumbent bicycle in which the seat includes a back rest against which the rider can lean and the pedals are positioned well forwardly of the seat so that reaction from the pedals can be directed by the rider into the back rest. One example of a bicycle of this type is shown in U.S. Pat. No. 4,283,070 and this patent is concerned with the positioning of the handle bars relative to the seat. In this arrangement the handle bars are positoned beneath the seat so the rider steers beneath him by linkage communicating the movement of the handle bars to the front wheel which is mounted in forks in conventional manner.

This bicycle has achieved some success and has a number of advantages over the conventional arrangement.

The steering arrangement is somewhat inconvenient in its positioning in that the rider is required to reach down beneath him and furthermore there is no provision for hand propulsion which is rendered a greater practical possibility in view of the fact that the reaction from the pedals is communicated into the back of the seat as opposed to the conventional arrangement where the reaction from the pedals is communicated to the hands of the rider which grasp the handle bars.

It is one object of the invention therefore to provide a recumbent bicycle in which propulsion from both pedals and hand operated levers can be provided while allowing the levers also to be used in a most convenient manner for steering of the front wheel of the bicycle.

Accordingly the invention provides a recumbent bicycle comprising a frame, a single front wheel mounted on said frame for pivotal steering movement, a rear wheel mounted on said frame, a seat having a back rest allowing the occupant to lean against the back rest, a pair of pedals arranged forwardly of the seat such that the occupant can communicate reaction from the pedals into the back rest, a chain wheel and drive chain communicating drive from the pedals to the rear wheel, a pair of levers extending in a generally upward direction, arranged forwardly of the seat and pivotal about a horizontal axis transverse to the bicycle for manual movement fowardly and rearwardly in opposed phase, means for communicating drive from said levers to said rear wheel, said levers being mounted for common manually operated pivotal movement about an axis longitudinally of the bicycle and means for communicating said common pivotal movement to said front wheel for steering movement thereof.

It is one advantage of the invention therefore that the rider sits in the seat with the levers immediately in front of him which can be operated to propel the bicycle and yet can very readily be tilted from side to side to obtain steering movement of the bicycle.

It is a further advantage of the invention that the levers communicate drive to the rear wheel of the bicycle through a chain wheel which drives the pedal chain wheel as opposed to an arrangement in which the levers directly drive the pedals thus providing a more efficient and smoother drive linkage between the hand levers and the rear wheel.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
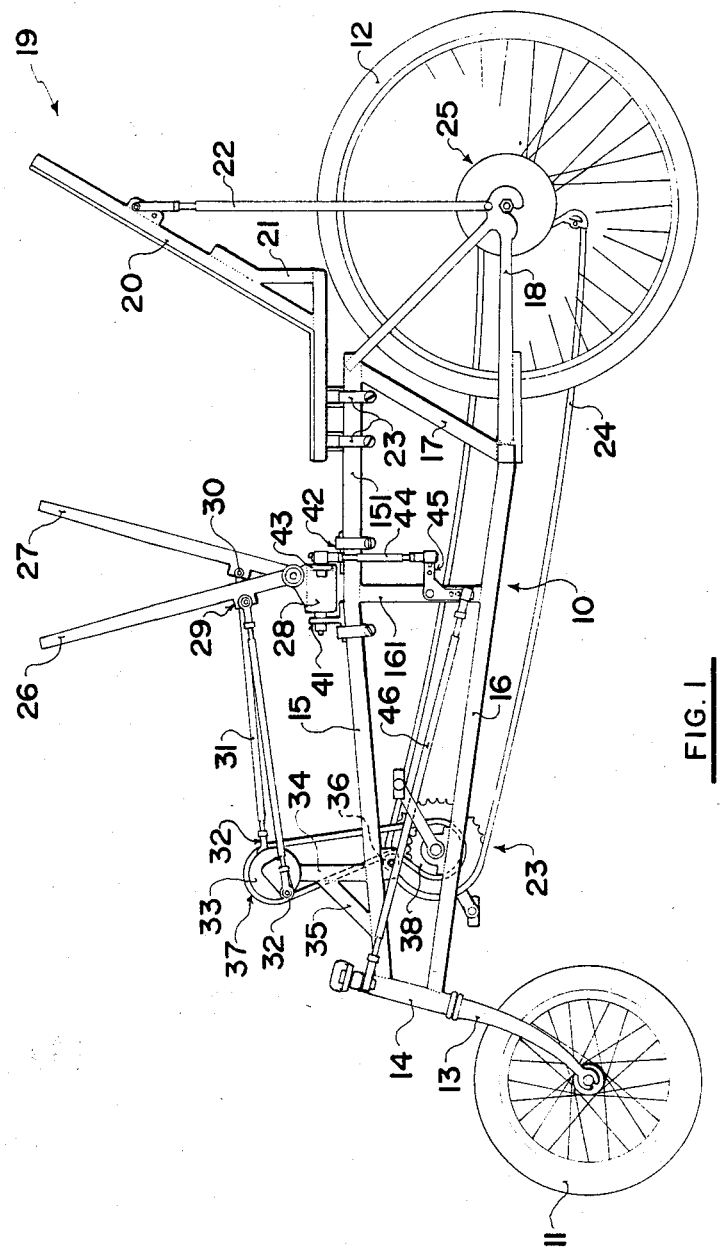
FIG. 1 is a side elevational view of a recumbent bicycle incorporating hand propulsion.
Figure 2:
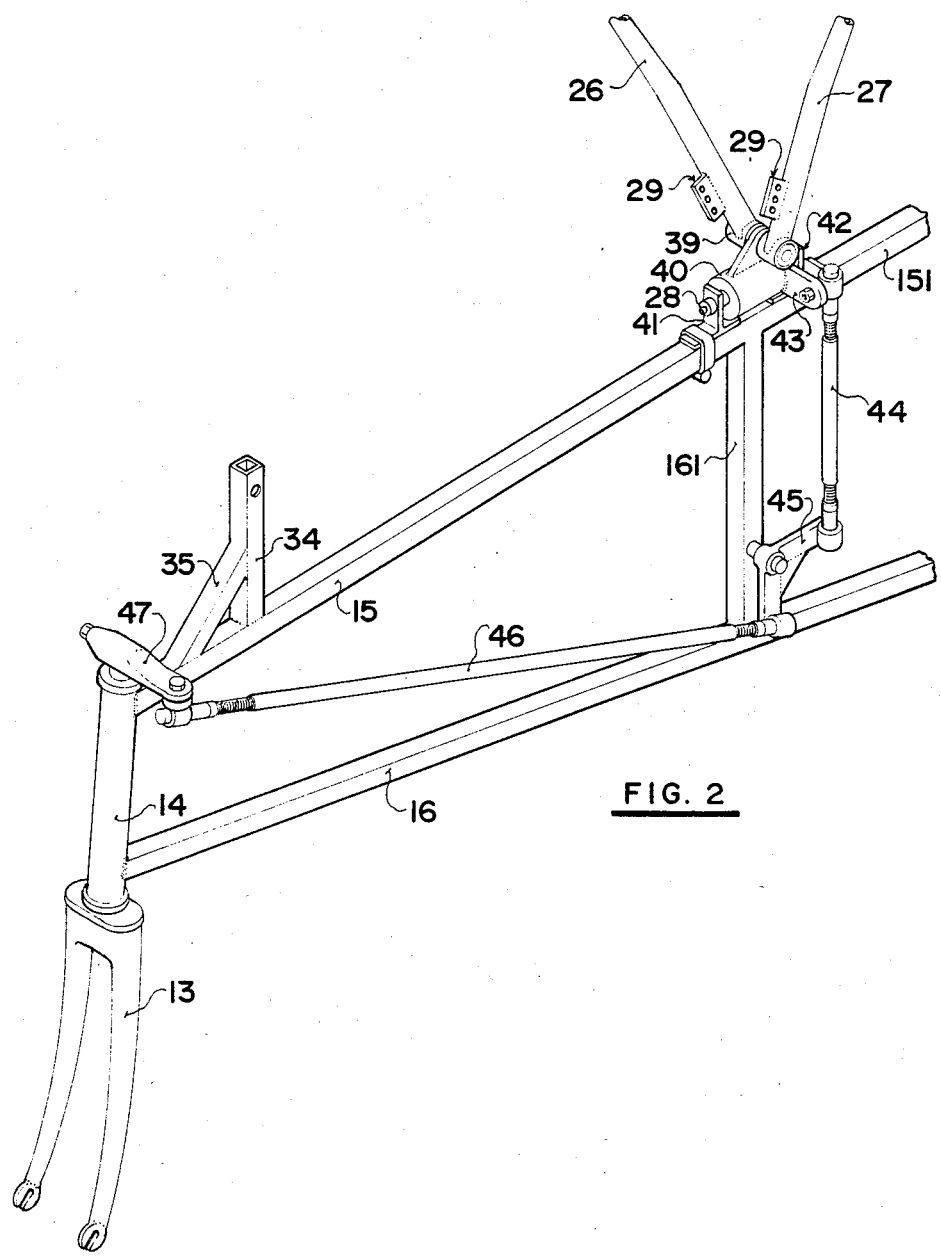
FIG. 2 is an isometric view of the bicycle of FIG. 1 from the same side and partly from the front showing only the steering linkage with other parts removed for simplicity of illustration.

The recumbent bicycle comprises a main frame 10 supporting a front wheel 11 and rear wheel 12. The front wheel is mounted in a conventional pair of forks 13 carried in a conventional headstock 14 which provides bearings for allowing the forks 13 to pivot about the axis of the headstock which is substantially vertical but is as in conventional arrangement inclined slightly forwardly. The headstock 14 is carried on an upper and lower longitudinal frame member 15, 16 which support the headstock and extend rearwardly toward the rear wheel. A first upright cross frame member 161 is positioned toward the mid-point of the bicycle with a second upwardly extending cross frame member 17 adjacent the rear wheel. Both the frame members 161 and 17 interconnect the upper and lower longitudinal frame members 15, 16 with the upper longitudinal member 15 having a first upwardly extending section toward the upright frame member 161 and then a second substantially horizontal section between the frame members 161 and 17.

Conventional rear forks 18 support the rear wheel relative to the top and bottom of the rear upwardly extending frame member 17.

A seat for the rider is positioned on the frame and above the rear wheel and is indicated at 19. The seat comprises a horizontal portion and a rear back rest portion 20 with the back rest supported relative to the horizontal portion by a right angle support bracket 21 and also by upwardly extending trusses 22 coupled to the rear wheel fork 18 adjacent the wheel hub. The horizontal portion of the seat is coupled to the frame by a pair of clamps 23 so the horizontal section is substantially parallel to the horizontal portion 151 of the frame.

The position of the seat can be adjusted forwardly and rearwardly by releasing the clamps 23 and by adjusting the length of the trusses 22.

A pair of pedals and cooperating chain wheel substantially of conventional construction are mounted on the frame section 16 in a bearing housing secured to the frame member 16, the arrangement being indicated generally at 23. The pedals are positioned forwardly of the seat 19 so that the rider can communicate the reaction from the pedals into the back rest of the seat as opposed to the conventional arrangement where the pedals are positioned generally beneath the saddle. The chain wheel of the pedal drive arrangement 23 communicates drive to the rear wheel of the bicycle in strictly conventional manner using a chain 24 and rear drive gear 25 which may incorporate change gears again of conventional type.

A hand propulsion system is mounted upon the frame immediately in front of the seat 19. The hand propulsion system comprises a pair of levers 26, 27 which are mounted for pivotal movement about a horizontal transverse axis on a support 28. The levers 26, 27 extend generally upwardly from the frame between the legs of the rider and can be pivoted forwardly and rearwardly by the rider to develop a propulsion force. Each of the levers includes a forwardly projecting lug 29 which carries a pivot pin 30 for supporting a connecting rod 31. The rods 31 extend forwardly from the respective lever to a pair of cranks 32 mounted upon a chain wheel 33. The cranks are arranged 180° out of phase so that the levers operate in opposed phase to rotate the chain wheel 33.

The chain wheel 33 is mounted in bearings on a frame extension portion provided by an upwardly extending frame leg and an inclined frame leg 34, 35 respectively. The frame legs 34, 35 thus provide rigidity to the chain wheel 33 to accommodate the reaction forces provided by the rider on the levers 26, 27. The chain wheel 33 is positioned substantially on the same level as the lugs 29 so that the connecting rods 31 extend generally horizontally forwardly from the levers 26, 27.

The chain wheel 33 drives a chain 37 which is tensioned by a spring mounted idler gear 36 to avoid slack in the chain which can cause jerking when drive force alternates between the hand levers and the pedals. The chain 37 drives a chain wheel 38 attached to the pedal/chain wheel arrangement 23. Thus manual operation of the levers 26, 27 drives the chain wheel 33 and thence the chain wheel 38 to provide additional force for driving the rear wheel 12.

The support 28 of the levers 26, 27 comprises an upper cylindrical bearing portion 39 for the pivotal movement of the levers 26, 27 which bearing portion extends transversely to the bicycle to provide the horizontal transverse axis. The bearing portion 39 is attached to a longitudinal horizontal bearing portion 40 which in turn is connected to a pair of lugs 41, 42 attached to the upper side of the frame member 15. Thus the levers 26, 27 and the support 28 can commonly pivot about a longitudinal horizontal axis provided by the bearing portion 40. The pivotal movement about the longitudinal horizontal axis can be accommodated relative to the chain wheel 33 which remains in fixed position vertically above the frame member 15 by flexible couplings provided at the ends of the connecting rods 31.

A transverse bar 43 is coupled to the bearing portion 42 for common pivotal movement therewith about the longitudinal axis. Movement of this bar is communicated via a pushrod 44 to a right angled lever 45 pivotally carried on the upright frame member 161. The lever 45 drives a further pushrod 46 which in turn drives a transverse bar 47 attached to the forks 13 within the headstock 14. Thus it will be appreciated that common pivotal movement of the levers 26, 27 about the longitudinal axis providing a side to side movement of the levers 26, 27 will be communicated via the rods 44, 46 and the lever 45 to the steering of the front wheel 11. More particularly, a pivotal movement of the levers commonly to the left will cause the rod 44 to move downwardly thus moving the rod forwardly and effectively longitudinally of the frame to pull the transverse bar 47 and cause a steering movement to the right. Conversely, pivotal movement of the levers towards the right causes a steering movement of the front wheel toward the left.

Brakes (not shown) can comprise conventional caliper brakes with operating levers attached to the hand levers 26, 27.

The rider therefore can sit back in reclined position in the seat while operating with his legs on the pedals forwardly of the seat to drive the bicycle forwardly. As and when he requires he can add to the propulsion effort of his legs by operating the levers 26, 27 with the force of his arms. In view of the opposite phase of the levers the reaction forces on the rider can be communicated from one lever to the other without interfering with the seating position of the rider. At the same time steering movements can be readily communicated to the bicycle merely by pivoting the levers 26, 27 commonly to one side or the other while continuing to operate them in the reciprocal movement or while the levers are stationary depending upon whether he wishes at that time to add to the propulsion effort.

The steering movements in the opposite direction to the intended turning direction allow the rider to balance his position on the bicycle and to provide a reaction against the force necessary to return from the turning position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A recumbent bicycle comprising a frame, a single front wheel mounted on said frame for pivotal steering movement, a rear wheel mounted on said frame, a seat having a back rest allowing the occupant to lean against the back rest, a pair of pedals arranged forwardly of the seat such that the occupant can communicate reaction from the pedals into the back rest, a first chain wheel and a first drive chain communicating drive from the pedals to the rear wheel, a pair of levers extending in a generally upward direction, arranged forwardly of the seat and pivotal about a horizontal axis transverse to the bicycle for manual movement forwardly and rearwardly in opposed phase, means for communicating drive from said levers to said rear wheel comprising a second chain wheel, a second chain connecting said second chain wheel to said first chain wheel, means mounting said first and second chain wheels for rotation about respective horizontal axes fixed on said frame and connecting rods communicating force from said levers to said second chain wheel in said opposed phase, said levers being mounted for common manually operated pivotal movement about an axis longitudinally of the bicycle and means for communicating said common pivotal movement to said front wheel for steering movement thereof.

2. A bicycle according to claim 1 wherein the longitudinal axis is horizontal.

3. A bucycle according to claim 2 wherein said levers are pivotally mounted relative to said transverse horizontal axis on a support, said support being mounted for pivotal movement about said longitudinal axis.

4. A bicycle according to claim 1 including an idler gear for tensioning the second chain.

5. A bicycle according to claim 1 wherein the communicating means includes a shaft, a lever for translating the common movement into movement of the shaft generally forwardly and rearwardly of the frame and a transverse bar connected to said shaft and to said front wheel whereby said forward and rearward movement of the shaft causes pivotal movement of said front wheel about a substantially vertical axis.

6. A bicycle according to claim 1 wherein the seat is mounted on a longitudinal frame member wherein the levers are mounted on the longitudinal frame member immediately in front of the seat.

7. A recumbent bicycle comprising a frame, a single front wheel mounted on said frame for pivotal steering movement, a single rear wheel mounted on said frame, a seat having a back rest allowing the occupant to lean against the back rest, a pair of pedals arranged forwardly of the seat such that the occupant can communicate reaction from the pedals into the back rest, a first chain wheel and a first drive chain communicating drive from the pedals to the rear wheel, a pair of levers extending in a generally upward direction, arranged forwardly of the seat and pivotal about a substantially horizontal axis transverse to the bicycle for manual movement forwardly and rearwardly in opposed phase, means for communicating drive from said levers to said rear wheel comprising a second chain wheel, a second chain connecting said second chain wheel to said first chain wheel, means mounting said first and second chain wheels for rotation about respective horizontal axes fixed on said frame and a pair of connecting rods each communicating force from a respective one of said levers to said second chain wheel in said opposed phase, said levers being mounted for common manually operated pivotal movement about an axis longitudinal of the bicycle and means for communicating said common pivotal movement to said front wheel for steering movement thereof, wherein said communicating means is arranged such that common pivotal movement to one side causes a steering movement of the front wheel to the other side.

8. A recumbent bicycle comprising a frame, a single front wheel mounted on said frame for pivotal steering movement, a rear wheel mounted on said frame, a seat having a back rest allowing the occupant to lean against the back rest, a pair of pedals arranged forwardly of the seat such that the occupant can communicate reaction from the pedals into the back rest, a chain wheel and drive chain communicating drive from the pedals to the rear wheel, a pair of levers extending in a generally upward direction, arranged forwardly of the seat and pivotal about a substantially horizontal axis transverse of the bicycle for manual movement forwardly and rearwardly in opposed phase, means for communicating drive from said levers to said rear wheel, said levers being mounted for common manually operated pivotal movement about an axis longitudinally of the bicycle and means for communicating said common pivotal movement to said front wheel for steering movement thereof, said communicating means being arranged such that common pivotal movement to one side causes the steering movement of the front wheel to the other side.

* * * * *